United States Patent [19]
Hunt

[11] 3,887,939

[45] June 3, 1975

[54] SCANNING APPARATUS AND METHOD USING SHARP AND UNSHARP SPOTS

[75] Inventor: Robert W. G. Hunt, North Harrow, England

[73] Assignee: Eastman Kodak Company, Rochester, N.Y.

[22] Filed: Apr. 23, 1973

[21] Appl. No.: 353,834

[30] Foreign Application Priority Data

Apr. 27, 1972 United Kingdom .............. 19691/72

[52] U.S. Cl. .............................. 358/75; 178/DIG. 2

[51] Int. Cl. .......................... H04n 3/28; H04n 9/08

[58] Field of Search ....... 178/DIG. 2, 6.7 R; 358/52, 358/75, 76

[56] References Cited

UNITED STATES PATENTS

| | | | |
|---|---|---|---|
| 2,691,696 | 10/1954 | Yule | 178/5.2 A |
| 2,865,984 | 12/1958 | Moe | 178/5.2 A |
| 2,911,468 | 11/1959 | Pourciau | 178/7.1 |
| 3,153,698 | 10/1964 | Hall | 178/5.2 A |
| 3,194,883 | 7/1965 | Ross | 178/5.2 A |
| 3,430,057 | 2/1969 | Genahr | 178/DIG. 2 |
| 3,449,509 | 6/1969 | Hobbs et al. | 358/52 |
| 3,450,830 | 6/1969 | Kyte | 178/5.2 A |
| 3,557,303 | 1/1971 | Jordan | 178/5.2 A |

*Primary Examiner*—Howard W. Britton
*Assistant Examiner*—Michael A. Masinick
*Attorney, Agent, or Firm*—T. H. Close

[57] ABSTRACT

In an apparatus and method for converting an image of a color object to an electrical signal and using sharp and unsharp spots, luminance information is the sole information derived from the sharp spot, while all color information is derived from the unsharp spot. Color signals derived from the unsharp spot are combined to produce a low definition luminance signal which is combined with a high definition luminance signal derived from the sharp spot to provide image edge enhancement.

9 Claims, 1 Drawing Figure

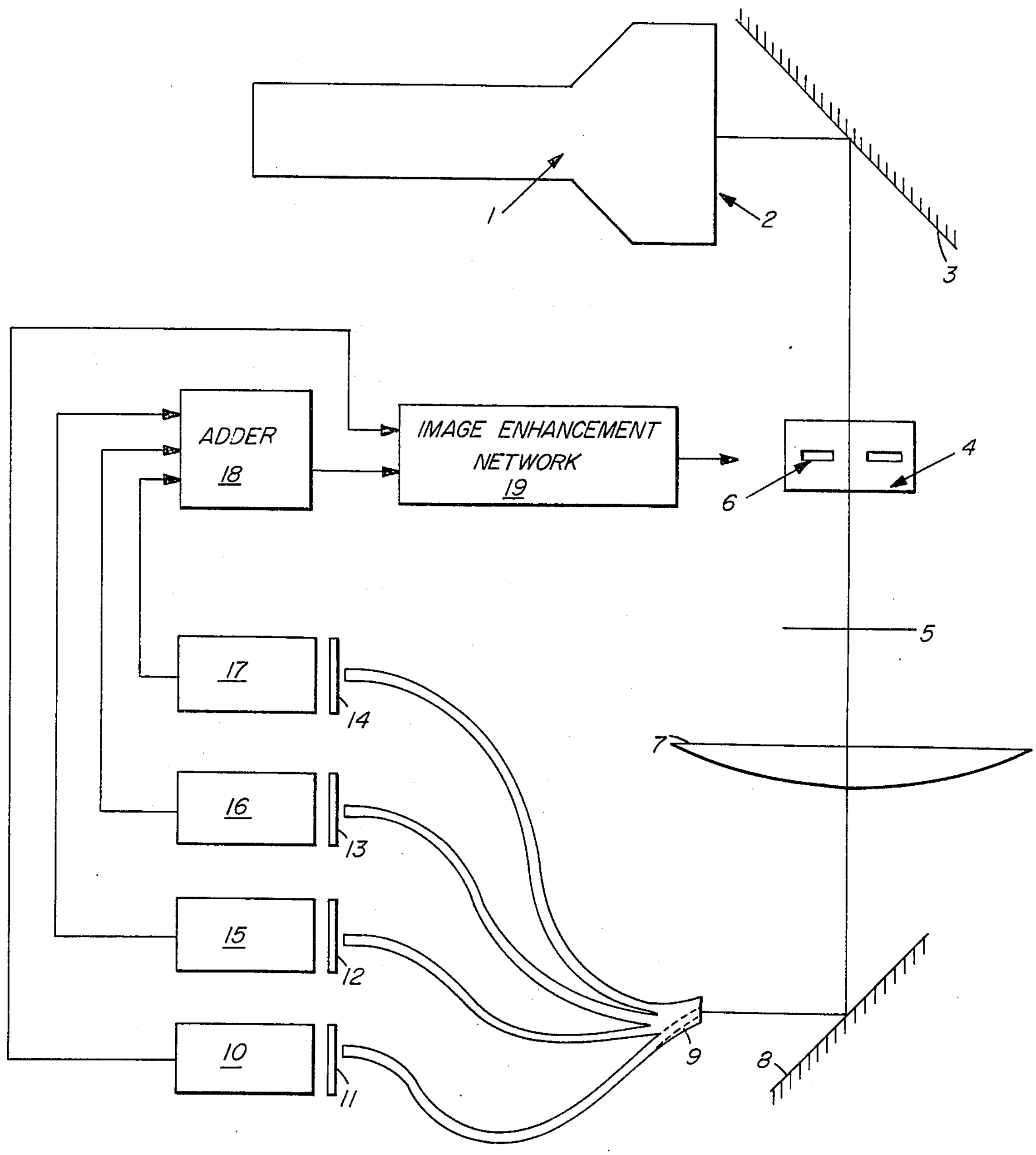
ADDER
18
IMAGE ENHANCEMENT NETWORK
19
17
16
15
10
1
2
3
4
5
6
7
8
9
11
12
13
14

SCANNING APPARATUS AND METHOD USING SHARP AND UNSHARP SPOTS

This invention relates to a method and apparatus for producing composite color electrical signals from optical scanning.

Equipment in which color objects, such as photographic transparencies or reflection prints, are scanned, is well known, and includes graphic-arts scanners and flyingspot, tele-cine or slide scanners for television use. Methods have also been described of scanning actual three dimensional scenes with laser beams.

In some graphic arts scanners a method known as unsharp masking is used, in which an object is simultaneously scanned with a small and with a large spot (see, for instance, "The Reproduction of Colour" by R. W. G. Hunt, Fountain Press, London, 2nd Edition, 1967, page 469). The information from these two spots is combined (generally by subtraction to give edge enhancement in reproduction. In such scanners the light from the small or from both spots is split to obtain color information.

Similarly, U.S. Pat. No. 3,557,303, issued Jan. 19, 1971, to Jordan et al., shows a color, graphic arts scanning system using simultaneously sharp and unsharp scanning. Light from each spot is split into three component colors. This system works well when the object being scanned is brightly illuminated, but because of this splitting of the light from each spot, the system does not work well when the scene illumination is not high.

It is an object of the invention to provide simultaneous sharp and unsharp scanning with a simplified and efficient signal processing system.

It is another object of the invention to provide a method and apparatus for simultaneous sharp and unsharp color scanning giving edge enhancement which apparatus and method are able to operate satisfactorily with less scene illumination than has heretofore been required.

According to the invention there is provided a method and apparatus for producing a composite color signal or signals by scanning a color object, such as a transparency, scene or print, with two spots of light, the first being a small sharp spot and the second a large or unsharp spot, providing a high definition luminance signal from the small spot and low definition color signals from the large spot.

In a preferred embodiment of the invention a low definition luminance signal is derived by adding together color components of the color signals; an image edge-enhancement signal is derived by substracting the low definition luminance signal from the high definition luminance signal and the resulting difference signal is added to one or more of the color signals.

The term "small spot" is widely used in the art and generally relates to a spot having a diameter approximately equal to or less than the distance between the centers of adjacent scanning lines. It follows that the large spot will have a diameter greater than this distance; commonly, it is approximately equal to the distance between four scanning lines. Hence, the signal from the small spot may be regarded as a high definition signal and that from the large spot as a lower definition signal.

Reference to the addition or subtraction of signals should be understood to refer either to the signals themselves or to some suitable function of them, such as logarithms of the signals. The two luminance signals will be understood to be derived from effective spectral sensitivity distributions which are similar to one another but not necessarily approximating the photopic spectral luminance efficiency distribution of the human eye.

The method and apparatus of the invention allow increased depth of focus of the scanning spot and/or increased signal-to-noise ratio of the scanned signals. Depth of focus is improved by the invention because only one signal, and that a luminance signal, is derived from the sharp spot. It is thus unnecessary to divide the light from this spot into three colored beams, as is commonly done by dichroic mirrors and trimming filters, and all the light can be collected by a single photodetector (although a filter may be used to improve the spectral response of the system). This represents a substantial increase in efficiency, of perhaps three or four times. This increase in efficiency can either be used to improve signal-to-noise ratio, or the relative aperture of the lens forming the scanning spot can be reduced and hence an increase in depth of focus can be obtained; or the advantage of the improved efficiency can be shared so as to result in some improvement in signal-to-noise ratio and some increase in depth of focus. Similar advantages apply to the color signals. Since they are derived from a larger or unsharp spot, the depth of focus will be greater than for a small spot. Thus, the relative aperture of the lens forming the larger or unsharp spot can be increased until the depth of focus is the same as it would have been with a sharp spot, so that signal-to-noise ratio is improved; or the advantage can again be shared to give some increase in depth of focus, and some increase in signal-to-noise ratio.

Graininess in photographic pictures is usually most noticeable in large areas of uniform luminance. In the present invention, these areas can be made to produce zero edge-enhancement signals if the high-definition luminance signal is "cored". This means that small excursions in signal amplitude, typical of those caused by film grain, are filtered out, and only the larger excursions, typical of scene subject-matter, are retained. Hence, in large areas of uniform luminance only the color signals will be operating; but these color signals are derived from the larger or unsharp spot, and hence the granularity of the larger areas will be reduced as compared to the granularity that would have been obtained with a small spot. Theoretical studies and experience in broadcast color television [see for instance R. W. G. Hunt, J. Roy. Television Soc., 11, 220 (1967)] suggest that, the diameter of the larger or unsharp spot can be about four times that of the sharp spot without losing any sharpness, and a change in scanning-spot size of this magnitude usually produces a very marked reduction in granularity. The granularity will not be significantly reduced in areas where the fluctuations of luminance are not removed by coring, i.e., areas having large and rapid changes in luminance. But the presence of high-contrast fine-detail in a picture tends to mask the granularity.

Further image edge-enhancement can be achieved in the present invention by amplifying the edge-enhancement signal more than the colour signals; in a preferred form of the invention this increased amplification would be obtained by adding to each of the color signals (logged or unlogged) a signal equivalent to a constant multiplied by the edge-enhancement signal, (logged or unlogged), the constant being greater than one.

The invention does result in a loss in fine-detail color information. However, for a given size of justdiscernible luminance fine-detail, the human eye only needs color fine-detail to be about one fourth as fine to be equally discernible. In the present invention, therefore, if the diameter of the larger or unsharp spot is about four times that of the small spot, no noticeable loss of color fine-detail should occur for picture sizes in which no loss of luminance fine-detail has occurred.

According to the invention, the two scanning spots can be formed from a single source of light. For example, where the spot is imaged onto the print or transparency by a lens (referred to hereafter as the scanning lens), the small spot may be imaged from the central zones of the lens and the larger or unsharp spot from the outer zones. One way of achieving this effect is to have a plate of glass or plastic material with a hole of the desired diameter in the plane of the aperture stop of the lens. Separation of the light coming from the small spot and from the larger spot can then be achieved by using condenser or relay lenses to form an image of the outer zones of the scanning lens on an annular mirror, the image of the central zones being formed on the center of the annulus. The light from the larger spot may then be analyzed by means of dichroic beam-splitters or fiber optics. Alternatively, the image of the central and outer zones may be allowed to fall directly on a fibre optic or light pipe analyzer. An example of such an arrangement is described in the specific embodiments below.

If the optical aberrations of the lens are such that its outer zones from an image of the scanning spot sufficiently out of focus in any suitable image plane for the purpose of the invention, such a lens may be used alone.

When a fiber optic beam splitter is used, it is not necessary for the fibers feeding each color channel to sample the same portions of the image of the outer zone of the scanner-lens plate. For instance, if it were desired to have the blue channel to depend on the largest, and the green on the smallest possible spot diameter within the zone, then the fibers going to the green channel could be grouped immediately around the inner (high-definition luminance) group of fibers, and the fibers going to the blue channel could be grouped around the periphery of the outer zone. Furthermore, the number of fibers feeding each channel does not have to be equal: if the red channel tended to have the worst, and the blue channel the best, signal-to-noise ratio, then it could be arranged for the red channel to have the most, and the blue channel the least number of fibers to make approximately equal the signal-to-noise ratios in the three channels.

BRIEF DESCRIPTION OF THE DRAWING

The sole FIGURE of the drawing is a schematic showing of a color scanning apparatus which may be used in the practice of the invention.

DETAILED DESCRIPTION OF PREFERRED EMBODIMENTS

Specific embodiments of the present invention will now be described with reference to the accompanying drawing.

According to the drawing, a cathode-ray tube 1 has a face plate 2 on which is formed a raster of lines, forming a rectangular scan of light. The raster of lines is imaged by a mirror 3 and a lens 4, onto a color original 5. The original can be a color photographic transparency. By other well known scanning techniques a color reflection print or actual scene can be scanned. The lens 4 has, in the plane of its aperture stop, an apertured plate 6 which may be made of a transparent or partially transparent plastic or glass, with a hole in its center. A condenser lens 7 and a mirror 8 form an image of this hole on the entrance end of a bundle 9 of optical fibers. The exit ends of the fibers are divided into four separate groups. The fibers whose entrance ends are located within the image of the hole in the plate all go to a photodetector 10 which is used to provide the high-definition luminance signal; a filter 11 may be used, if necessary, to improve the spectral response of this channel. The fibers whose entrance ends lie outside the image of the hole are divided into three groups so that their exit ends allow the light to pass through either a red 12, a green 13, or a blue 14, filter and then on to one of three photodetectors 15, 16, 17 or groups of photodetectors, situated behind the filters; these photodetectors provide the lower-definition color signals.

The lower definition color signals from photodetectors 15, 16 and 17, are fed to an adder 18 which adds together the three lower definition color signals to derive a lower definition luminance signal. Such a lower definition luminance signal is fed to an image enhancement network 19, which modifies the high definition luminance signal from photodetector 10, as a function of the lower definition luminance signal from adder 18, so as to produce an image-enhanced luminance signal. Image enhancement using unsharp masking per se is well known. See, for example, U.S. Pat. No. 2,911,468 to Pouriciau.

If the amplitude of the high-definition luminance signal is denoted by L, the amplitude of the lower definition luminance signal by L', and the amplitude of the lower-definition color signals by R G and B, then the signal processing which takes place is in the following form:

First the lower definition luminance signal, L', is formed:

$$L' = lR + mG + nB$$

where $l$, $m$ and $n$ are coefficients which are a function of color balance. Then all the signals are passed through logarithmic amplifiers to obtain log $L$, log $L'$, log $R$, log $G$ and log $B$. Either the signal log L, or the difference signal log $L$ - log $L'$, may then be "cored" to obtain $(\log L)_c$ or $(\log L - \log L')_c$. The lower definition color signals are then passed through electronic masking circuits (see for instance, "The Reproduction of Colour" 1967, p. 425) to obtain corrected signals:

$$\log R' = a_1 \log R + a_2 \log G + a_3 \log B$$
$$\log G' = a_4 \log R + a_5 \log G + a_6 \log B$$
$$\log B' = a_7 \log R + a_3 \log G + a_9 \log B$$

where $a_1, a_2, a_3, a_4, a_5, a_6, a_7, a_8, a_9$ are coefficents. The edge-enhancement signal C is then obtained thus:

$$\log C = k[(\log L)_c - \log L'] \text{ or } k[\log L - \log L']_c$$

where $k$ is a constant. Finally the edge-enhancement signal is added to one or more of the corrected color signals thus:

$$\log R' + \log C$$
$$\log G' + \log C$$
$$\log B' + \log C$$

These composite signals are then further processed as required for viewing or recording.

To illustrate the advantages of the invention, the way in which it can be applied to a television slide scanner will be described. A typical television slide scanner operates with a lens having a focal length of 50 mm and a relative aperture of *f*/5.6; the aperture is thus 8.9 mm in diameter. The light is normally passed through beam-splitting dichroic mirrors and trimming filters so that, if the present invention is used at the same relative aperture, an increase of about four times the amount of light on the photodetector used for the high-definition luminance signal occurs. For the same signal-to-noise ratio the relative aperture can therefore be cut down to *f*/11, and this can be achieved by having the hole in the plate in the lens of 4.45 mm diameter. The fiber-optic beam splitting device shown in FIG. 1 is simpler, less expensive, and much less prone to color-shading effects over the picture area, than is the case for the normal dichroic beam-splitting mirror system, but it is less efficient, by a factor of about three to one, because in each color channel about two-thirds of the light is wasted. However, if the lens 4 has a relative aperture of *f*/2.8, the amount of light in each color channel will actually be slightly increased, because the wider aperture, *f*/2.8 minus the central core at *f*/11, provides 15/4, or 3¾, times the amount of light, and this more than offsets the three to one loss caused by the opticfibers; hence the signal-to-noise ratios in the color channels will not be reduced. We thus have the situation where the invention has maintained signal-to-noise ratio in all four photodetectors, in spite of using a simpler and less expensive beam-splitting device, and has considerably improved depth of focus by using a relative aperture of *f*/11 instead of *f*/5.6 for the light forming the small spot. Although a relative aperture of *f*/2.8 is used for the color signals, if the larger or unsharp spot which it forms is about four times the diameter of the sharp spot, as theory and experience in broadcast television suggest it should be, then the percentage change in effective spot diameter caused by a given shift in the position of the film will be the same for the small and for the larger or unsharp spot, because the latter is formed by a lens of four times the aperture diameter (*f*/2.8 as against *f*/11) so the improvement in depth of focus should be the same for both the high-definition luminance signal and for the lower-definition colour signals.

As another example we may consider a super 8 tele-cine apparatus. A lens having a focal length of 25 mm would commonly be used, and to pick up the same amount of light as the 50 mm lens considered above the relative aperture would have to be increased from *f*/5.6 to about *f*/2.8. Assuming that the depth of focus is no problem in a tele-cine machine, because the film can be kept flat and in a well-defined plane more easily than in a slide scanner, it is desirable to work at high apertures to improve signal-to-noise ratios and to reduce the prominence of scratches on the film. In this case, therefore, the invention would be applied by using a relative aperture of *f*/2.8 for the high-definition luminance signal, which, with a four-fold increase in optical efficiency, would give an improvement of four times in signal-to-noise ratio. If the larger or unsharp spot is formed by a relative aperture of *f*/1.25, this would also provide an improvement in signal-to-noise ratio of four times (*f*/1.25 minus *f*/2.8 compared to *f*/2.8), if dichroic beam-splitters are used. Although a similar improvement in signal-to-noise ratio could in theory be obtained without the use of the invention merely by using an *f*/1.25 lens in a conventional tele-cine apparatus, in practice the use of a lens of such wide relative aperture to focus a small spot would be liable to cause some loss of definition especially at the corners of the picture; such difficulties are much alleviated, and greater depth of focus is achieved, with the invention, by using the *f*/2.8 relative aperture for the high-definition luminance signal, and the *f*/1.25 part of the lens only for the larger or unsharp spot for the color signals. If it is desirable to have more depth of focus than afforded by the *f*/2.8 lens, then the high-definition spot could be formed from a relative-aperture of *f*/4, giving a two-fold increase in signal-to-noise ratio. In this case the *f*/1.25 relative aperture could still be used for the larger or unsharp spot without reducing the depth of focus if its diameter were about 4 times that of the small spot. This would give a nine-fold increase in the optical efficiency over the use of dichroic beam-splitters, or a three times increase in signal-to-noise ratio if a fiber-optic beam splitting system were used.

The invention can also be arranged to provide soft-focus effects such as are sometimes used in portraiture. In this case the value of the constant $k$ can be chosen to be less than one. For some applications it may be desirable to replace the constant $k$ by a variable which is a function of luminance or some other parameter.

The invention has been described in detail with particular reference to a preferred embodiment thereof. It will be understood, however, that variations and modifications can be effected within the spirit and scope of the invention.

I claim:

1. Apparatus for producing electrical signals corresponding to information from a color object, said apparatus comprising:

a. means for scanning a color object with two spots of light, the first of said spots being small and sharp, and the second of said spots being large and unsharp, b. first means utilizing substantially all of and only the light passing from the first spot scan of such object, for producing a high definition luminance signal, and c. second means, utilizing substantially all of the light passing from the second spot scan of such object, for producing low definition color signals.

2. The apparatus defined by claim 1 further comprising:

a. means for producing a low definition luminance signal from said low definition color signals by adding together portions of said low definition color signals, b. means for deriving an image edge-enhancement signal by subtracting said low definition luminance signal from said high definition luminance signal; and c. means for adding said edge-enhancement signal to one or more of said low definition color signals.

3. The apparatus defined by claim 1, wherein said first means includes a luminance photodetector and optical fiber means positioned to receive information from said small spot of light, and to transmit such information to said luminance photodetector, and said second means includes a plurality of color photodetector means, each having differing spectral sensitivity, and a plurality of optical fiber means, each corresponding to a color component being detected, positioned so as to receive information from said large spot of light, and to transmit such information to the corresponding color photodetector means.

4. The apparatus defined by claim 1, wherein the diameter of said large spot of light is about four times the diameter of said small spot of light.

5. The apparatus defined by claim 1, wherein said scanning means comprises:

a. a cathode ray tube for producing a raster scan, b. lens means for focusing said raster scan, and c. an apertured plate positioned in the plane of the aperture stop of said lens means, said plate being composed of a material which is at least partially transparent.

6. The apparatus defined by claim 5, wherein the diameter of said small spot of light is approximately equal to or less than the distance between the centers of adjacent scanning lines.

7. A method of producing an electrical signal or signals corresponding to information from a color object, said method comprising the steps of:

a. scanning a color object with first and second spots of light, said second spot being larger than said first spot, b. utilizing substantially all of, and only, the light from the first spot scan for producing a high definition luminance signal, and c. utilizing substantially all of the light from said second spot scan for producing color signals.

8. The method defined by claim 7 comprising the further steps of:

a. producing a low definition luminance signal by adding together portions of said color signals, b. deriving an image edge-enhancement signal by subtracting said low definition luminance signal from said high definition luminance signal, and c. adding said image edge-enhancement signal to one or more of said color signals.

9. The method defined by claim 7 in which said first and second spots are formed from a single source of light.

* * * * *